United States Patent [19]
Klaiber et al.
[11] Patent Number: 4,716,651
[45] Date of Patent: Jan. 5, 1988

[54] APPARATUS FOR REMOVING INSULATION AND CONNECTING ELECTRICAL CABLES

[75] Inventors: Eberhard Klaiber; Dieter Gerke, both of Berlin, Fed. Rep. of Germany

[73] Assignee: Krone GmbH, Berlin, Fed. Rep. of Germany

[21] Appl. No.: 872,403

[22] Filed: Jun. 10, 1986

[30] Foreign Application Priority Data

Jun. 18, 1985 [DE] Fed. Rep. of Germany ....... 3522131

[51] Int. Cl.[4] .......................... H02G 1/00; H02G 1/12
[52] U.S. Cl. ..................................... 29/750; 29/564.4; 29/764; 29/861
[58] Field of Search ................. 29/750, 753, 764, 861, 29/564.4; 81/9.41, 9.42, 9.43

[56] References Cited

U.S. PATENT DOCUMENTS 2,591,649 4/1952 Whiting ........................... 81/9.42 X
3,604,092 9/1971 Knickerbocker ..................... 29/750

*Primary Examiner*—P. W. Echols
*Assistant Examiner*—Taylor J. Ross
*Attorney, Agent, or Firm*—St. Onge Steward Johnston & Reens

[57] ABSTRACT

The invention relates to a method of and to an apparatus for attaching cables 20, to cutting-clamping terminals 44 wherein the cables have insulator sheaths 21 which are relatively thick in comparison with the diameters of their cores 22. A precutting device 11 is provided having a lever 23 of U-shaped cross-sectional outline which is mounted on the shank 14 of an applying hand tool. The inner sides 33 of the lateral walls 56, 57 of the U-shaped lever 23 carry arcuate knives 12, 13. These knives remove, at a predetermined contact area 37 of a cable, two portions 34, 35 of insulating material from the insulating shell 21 so that the contemplated contact area can be more readily forced into the slot 45 of a cutting-clamping terminal 44. The means on the shank for forcing the cable core 22 into the slot 45 comprises insertion ribs 32 at one end of the applying hand tool the other end of which is adjacent to a hollow arcuate handle 15 (FIG. 2).

5 Claims, 5 Drawing Figures

APPARATUS FOR REMOVING INSULATION AND CONNECTING ELECTRICAL CABLES

Figure 1:
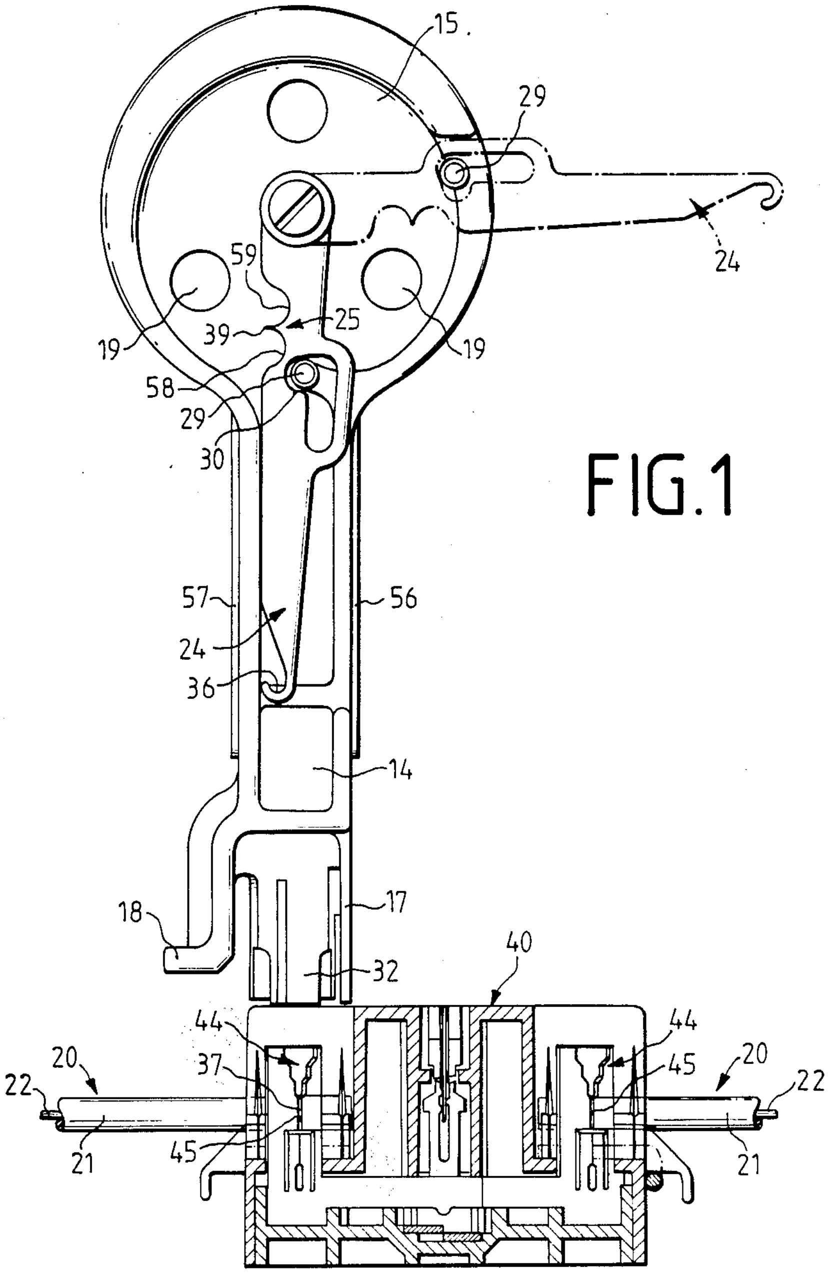

The invention relates to a method of and apparatus for connecting electrical cables, having relatively thick insulating covers in comparison with the diameters of the cable cores, to cutting-clamping terminals.

U.S. Pat. No. 2,610,461 discloses bus bars (connecting blocks) with cutting-clamping terminals each of which comprises two contact tongues flanking an open elongated slot and made of a thin springy sheet metal stock. When the cable is forced into the slot, the relatively sharp edges of the tongues first sever the insulating sheath of the cable. In the next step, the edges of the tongues penetrate to a certain extent into the material of the core of the cable in order to establish the desired electrical connection.

For insertion of the insulated cable into the slot and for extraction of a previously inserted cable from the slot, there is provided a specially designed tool which is disclosed in German Utility Model No. 80 13 494. However, this conventional tool can be used only for attachment to cutting-clamping terminals of cables having small diameters. For attachment of cables wherein the insulating sheath is relatively thick in comparison with the cable core, for example, cables of the type used to carry heavy currents or cables which are used for outside telecommunication purposes (the so-called drop-wire cables), it is presently customary to employ threaded clamping terminals. They necessitate insulation of the cable cores and time-consuming threading operation.

However, German Patent No. 32 14 896 already discloses a cutting-clamping terminal which renders it possible to attach, without involving insulation work, wires of different outer and inner conductor diameters and different insulating materials. Such cutting-clamping terminals are inserted into connector blocks of the type disclosed in the published German patent application No. 34 15 396. However, insertion of cables having insulating sheaths which are relatively thick in comparison with the diameters of the cable cores necessitates the application of substantial insertion forces in order to force the cable cores into the cutting-clamping terminals, and such substantial forces cannot be applied by resorting to heretofore known applying tools.

Accordingly, it is an object of the invention to provide a method of and an apparatus for attachment of cables having relatively thick insulating sheaths (when compared with the diameters of the cable cores) to cutting-clamping terminals in such a way that a relatively small force must be applied for introduction of the relatively thick cable into the cutting-clamping terminal.

Such object is accomplished by initially removing at least a portion of the cable sheath at the desired contact area and then forcing this area between the legs of a cutting-clamping terminal. A hand tool is provided with which the cable is prepared for insertion. The tool has a cable flute in a shank. A pair of cutters are so pivotally disposed with respect to the cable flute that they can at least partially cut away the insulator sheath of a cable placed in the flute.

Due to at least a partial cutting-away of the insulating sheath in the region of contemplated establishment of an electric contact prior to the cable insertion step, it is possible to considerably reduce the insertion force needed during the insertion of a relatively thick cable between the cutting-clamping terminals. Such force reduction is advantageously obtained by the removal of two portions of the thick insulating sheath with the portions disposed opposite each other and located in the region where it is desired to make electrical contact with the prongs of the cutting-clamping terminal.

This is effected in the improved apparatus with the inclusion of a cable precutting device formed with two arcuate knives. In the course of the connecting operation, i.e., during insertion of the contact region of the cable (which has been pre-treated in accordance with the invention) into the slot of the cutting-clamping terminal, the cutting edges which flank the slot need only penetrate thinner layers of insulating material to thus allow for a considerable reduction of the cable insertion force. Furthermore, the elastic prongs of the terminal are unlikely to be damaged.

Further advantages and objects of the invention can be understood from the following description. It is to be noted here that the novel apparatus can be applied directly to connecting blocks of many terminals or that it can be designed as a hand tool in the form of a so-called cable applicator tool.

The invention will be explained in greater detail hereinafter with reference to an embodiment which shows an applicator tool.

Figure 2:
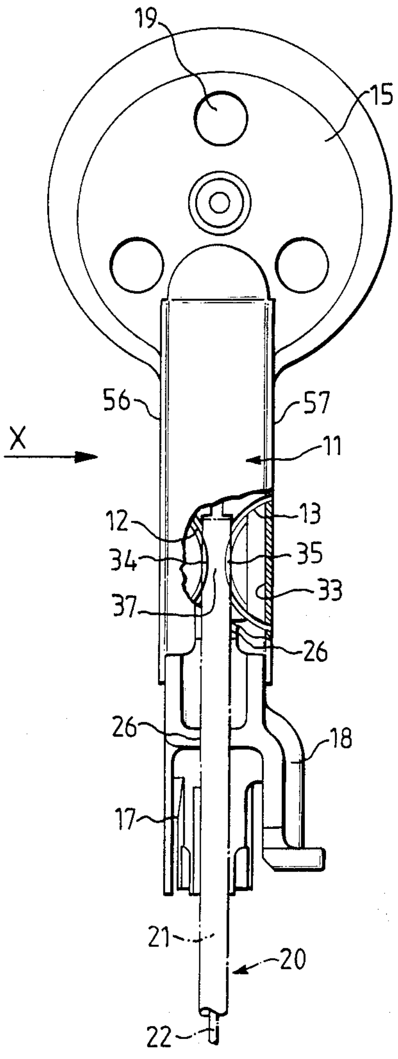
Figure 3:
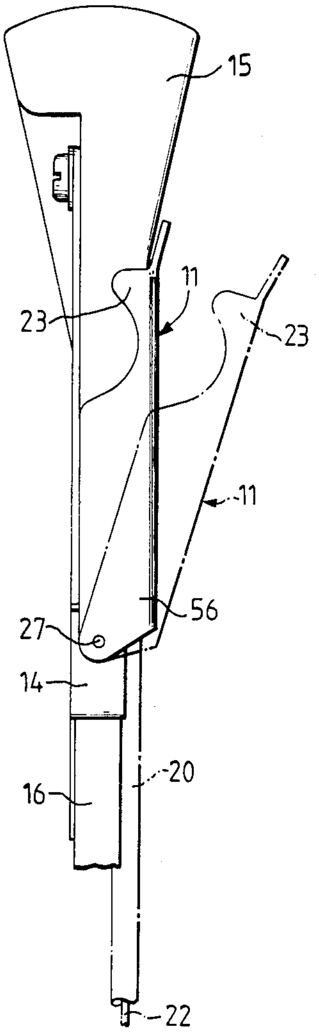
Figure 4:
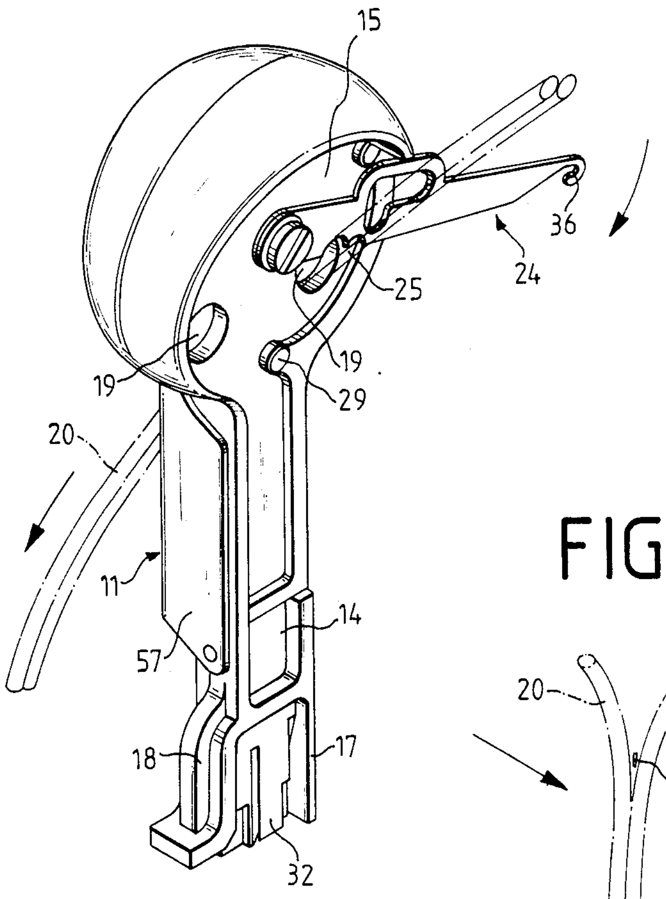
Figure 5:
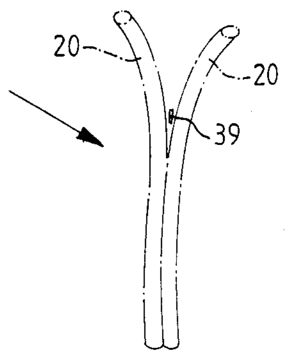

FIG. 1 is an elevational view of an attaching tool taken from the side which is provided with a pull hook, and a connecting block which is disposed below the tool and carries cutting-clamping terminals, FIG. 2 is a somewhat smaller-scale elevational view of the attaching tool from the side which is provided with a cable precutter, FIG. 3 is an end elevational view of the attaching tool as seen in the direction of arrow X in FIG. 2, FIG. 4 is a perspective view of the attaching tool with the pull hook extended, and FIG. 5 is a fragmentary elevational view of a twin-coarse cable which has been split by the pull hook.

With reference to the Figures, the attaching tool comprises a shank 14 (base portion) with a handle 15 at one end and with a guide rib 17, a lever 18 and pressing-in or insertion ribs 32 at the other end. All of the parts 14, 15, 17, 18 and 32 are made of one piece from a synthetic plastic material exhibiting a stability which is required in a hand tool. The arcuately rounded handle 15 serves for manual application of an inserting force which is transmitted to the insertion ribs 32 in order to be capable of forcing cables 20 having relatively thick insulating sheath 21 (in comparison with the diameters of the cable cores 22) into the cutting-clamping terminals 44 of terminal block 40. The guide rib 17 ensures predictable functioning of the insertion ribs 32. The lever 18 serves for extraction of excess voltage diverting conductor magazines (not shown) which are inserted into the terminal block 40.

The shank 14 of the applicator tool carries a precutting device 11 for the thick cable 20. This precutting device comprises a U-shaped lever 23 which is pivotable about the shaft 27. The U-shaped lever 23 carries at the inner sides 33 of its sidewalls 56, 57 discrete arcuate knives 12, 13. These knives are spaced apart a distance which at least equals the diameter of the cable core 22 of the cable 20 and their apices are disposed opposite each other (see FIG. 2). The open side of the U-shaped lever 23 faces toward the shank 14 so that the sidewalls 56, 57 flank the shank 14 when the lever 23 is held in the closed position shown in FIG. 3 by solid lines. The synthetic plastic material of the shank 14 defines a guide flute 26 for reception and proper positioning of the cable 20.

Prior to forcible introduction of a cable 20, whose insulating sheath 21 is relatively thick in comparison with the diameter of the cable core 22, into a cutting-clamping terminal 44 of the terminal block 40, the cable 20 is placed into the guide flute 26 while the lever 23 is held in its open (non-depressed) position (shown by phantom lines in FIG. 3). The guide flute 26 extends in the longitudinal direction of the shank 14. The lever 23 is then depressed to cut the insulating sheath 21 of the cable 20 at the desired region by means of the arcuate knives 12, 13 which are provided at the inner sides 33 of the sidewalls 56, 57 of the lever 23. The cuts are made at the location 37 where the cable is to be electrically connected with the prongs of the terminal 44. The knives 12, 13 remove two portions 34, 35 from the insulating sheath 21 (see FIG. 2). After the lever 23 is returned to the phantom-line position of FIG. 3, the cable 20 is removed from the guide flute 26 and is placed into the cutting-clamping contact 44 of the bus bar 40 in such a way that the location 37 of the removed material (34, 35) is adjacent to the prongs of the terminal 44, i.e., it is located in the slot 45. The insertion is carried out by the pressing-in ribs 32 whose shapes conform to that of the cutting-clamping terminal 44.

A pull hook 24 is rotatably mounted at the center of the circular disc-shaped handle 15, and this hook comprises a hook-shaped end portion 36 for extraction and removal of a cable 20 which was forcibly introduced into a cutting-clamping terminal 44. A detent device 30 is provided for the pull hook 24, and this detent device comprises two projections 29 provided on the handle 15 and a detent member 30 in the pull hook. This enables the pull hook 24 to assume two different positions, namely the idle position which is shown in FIG. 1 by solid lines and in which the pull hook 24 extends in parallel with the shank 14, and the position which is shown in FIG. 1 by phantom lines (and by solid lines in FIG. 4) in which the pull hook 24 extends substantially at right angles to the shank 14.

The handle 15 is further provided with three pass through openings 19 for cables 20. The pull hook 24 is provided with a severing device 25 having two arcuate cutouts 58, 59 flanking a pointed tooth 39 (see FIG. 1). A multiple or twin cable (FIG. 5) is caused to pass through one of the openings 19 in the handle 15; in the next step the pointed tooth 39 of the pull hook 24 is moved close to such opening 19 so that the tooth 39 is disposed between the two halves (cables) 20 of the twin cable and the tooth 39 divides the twin cable into two discrete cables 20 while the twin cable is pulled through the selected opening 19.

Having thus described an embodiment of the invention its advantages can be understood. Variations can be made without departing from the scope of the following claims.

We claim:

1. An apparatus for attaching a cable, having an insulating sheath surrounding a cable core, to a cutting-clamping terminal, comprising:
   - a base having a cable flute and a precutting device formed with a lever having a U-shaped cross-section with opposite side walls defining a channel therebetween, said lever being pivotally-mounted to the base so that, upon pivotal closure of the lever, the channel aligns with the cable flute,
   - a pair of arcuate knives which are mounted to the side walls and are so disposed opposite each other as to define between themselves a space having a width that at least matches the diameter of the cable core to at least partially cut away the insulating sheath of a cable which has been inserted into the cable flute.

2. An apparatus for attaching a cable, having a relatively thick insulating sheath in comparison with the diameter of the cable core, to a cutting-clamping terminal, comprising:
   - a base having a cable flute and a precutting device which is pivotally-mounted on the base so as to at least partially cut away the insulating sheath of a cable which has been inserted into the cable flute,
   - said base constituting the shank of a hand tool, said hand tool having a handle portion which is arcuate and rounded and has a free shank portion with guide ribs to guide the insertion of a cable between cutting-clamping terminals on a connecting block.

3. The apparatus according to claim 2, characterized in that the shank of the hand tool has a lever (18) shaped to remove an excess-voltage-diverting-conductor magazine which is inserted into the connecting block.

4. The apparatus according to claim 2 or 3, characterized in that the handle portion of the hand tool has several openings and a pull hook, said pull hook having a cable separating device that is mounted to pivot into the region of the openings in order to subdivide a multiple cable into discrete cables by means of the cable separating device upon advancement of a multiple cable through an opening.

5. The apparatus according to claim 4, characterized in that the pull hook has a detent device and the handle portion has two detent projections to define two different positions for the pull hook.

* * * * *